:::::: US010671413B2

(12) United States Patent
St. Clair (10) Patent No.: US 10,671,413 B2
(45) Date of Patent: *Jun. 2, 2020

(54) SOCIAL FILTERING OF USER INTERFACE

(71) Applicant: Facebook, Inc., Menlo Park, CA (US)

(72) Inventor: Luke St. Clair, Corte Madera, CA (US)

(73) Assignee: Facebook, Inc., Menlo Park, CA (US)

( * ) Notice: Subject to any disclaimer, the term of this patent is extended or adjusted under 35 U.S.C. 154(b) by 494 days.

This patent is subject to a terminal disclaimer.

(21) Appl. No.: 15/444,052

(22) Filed: Feb. 27, 2017

(65) Prior Publication Data

US 2017/0168855 A1    Jun. 15, 2017

Related U.S. Application Data

(63) Continuation of application No. 13/839,984, filed on Mar. 15, 2013, now Pat. No. 9,582,589.

(51) Int. Cl.
*G06F 3/00* (2006.01)
*G06F 9/451* (2018.01)
(Continued)

(52) U.S. Cl.
CPC .............. *G06F 9/451* (2018.02); *G06F 3/048* (2013.01); *G06F 16/9535* (2019.01); *G06F 16/9537* (2019.01)

(58) Field of Classification Search
CPC .. G06F 16/29; G06F 16/9535; G06F 16/9537; G06F 16/245; G06F 3/0482;
(Continued)

(56) References Cited

U.S. PATENT DOCUMENTS

| 2011/0159890 A1* | 6/2011 | Fortescue | G06Q 30/02 455/456.2 |
| 2012/0190387 A1* | 7/2012 | Redstone | G06Q 10/10 455/456.3 |

(Continued)

FOREIGN PATENT DOCUMENTS

| JP | 2003-528398 | 9/2003 |
| JP | 2010-530090 | 9/2010 |

(Continued)

OTHER PUBLICATIONS

Australia Government Patent Examination Report No. 1 for Application No. 2014235568 (with translation), dated May 10, 2017.
(Continued)

*Primary Examiner* — Linh K Pham
(74) *Attorney, Agent, or Firm* — Jordan IP Law, LLC (57) ABSTRACT

In one embodiment, a method includes identifying a content object for display based at least in part on one or more filtering criteria. The filtering criteria is a measure of suitability of each content object for presentation based at least in part on social-graph information between a first user and one or more second users or a current geo-location of the first user. The method also includes applying the filtering criteria to the content object; and providing for display on a user interface (UI) the content object based on whether the content object is suitable for presentation based at least in part on the filtering criteria.

20 Claims, 6 Drawing Sheets

(51) Int. Cl.
*G06F 3/048* (2013.01)
*G06F 16/9535* (2019.01)
*G06F 16/9537* (2019.01)

(58) Field of Classification Search
CPC ... G06F 3/04842; G06F 3/0481; G06Q 50/01; G06Q 10/10
See application file for complete search history.

(56) References Cited

U.S. PATENT DOCUMENTS

| | | | | |
|---|---|---|---|---|
| 2012/0284297 | A1* | 11/2012 | Aguera-Arcas | G06F 3/03547 707/769 |
| 2013/0275429 | A1* | 10/2013 | York | G06Q 50/01 707/737 |

FOREIGN PATENT DOCUMENTS

| | | |
|---|---|---|
| JP | 2011-254336 | 12/2011 |
| JP | 2012221207 A | 11/2012 |
| KR | 2006-0010646 | 2/2006 |
| WO | 2012/148924 | 11/2012 |
| WO | 2012/170446 | 12/2012 |

OTHER PUBLICATIONS

Office Action for JP 2016-501516, dated Mar. 1, 2017.
Decision of Rejection for JP Patent Application No. 2016-501516, dated Oct. 3, 2017.
KR Office Action received from KIPO for Patent Application No. 10-2015-7029679. (with English Translation), dated Aug. 20, 2018.
Decision to reject Amendment received from KIPO for Patent Application No. 10-2015-7029679. (with English Translation), dated Aug. 20, 2018.
JP Office Action received from JPO for Patent Application No. 2018-018034. (with English Translation), dated Nov. 13, 2018.
Notice of Final Rejection for JP Patent Application No. 10-2015-7029679, dated Apr. 19, 2018.
Damiani, Maria Luisa et al., "Access Control Systems for Geospatial Data and Applications" Springer, pp. 189-214, 2007.
Examination Report No. 2 for AU Patent Application No. 2014235568, dated Mar. 14, 2018.
Notice of Preliminary Rejection for KR 10-2015-7029679, dated Sep. 7, 2017.
JP Office Action received from JPO for Patent Application No. 2018-018034. (with English Translation), dated Oct. 1, 2019.

* cited by examiner

SOCIAL FILTERING OF USER INTERFACE

PRIORITY

This application is a continuation under 35 U.S.C. § 120 of U.S. patent application Ser. No. 13/839,984, filed 15 Mar. 2013.

TECHNICAL FIELD

This disclosure generally relates to content filtering.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, one or more content objects associated with one or more "friends" of the user displayed on a user interface (UI) may be filtered based one or more criteria. For example, the content objects may be images or a status update directed to the user that are displayed on a UI of a computing device. One example criterion may be an amount of "closeness" between the user and each "friend" based on an amount of overlap between the user profile or other social-graph information of each "friend" and the user. For example, the UI may display content objects from "friends" with user profiles with a high amount of commonality with the user, such as for example age, education, interests, or religion. As another example, the lock screen may display content objects from "friends" who based on social-graph information are patrons of the same establishments or "like" similar music, books, TV shows, or sports teams.

Another filtering criterion may be a maturity threshold level for particular geo-location, where content objects with a maturity rating above the threshold may be displayed on the UI. For example, the maturity threshold might be lower when the mobile computing device is at an adult establishment, such as for example, a bar or dance club relative to the maturity threshold when the mobile computing device is at a more "family-friendly" or upscale location, such as for example, DISNEYLAND, a church, or high-end restaurant. As an example, the lock screen may allow selection content objects with a high maturity rating shared by "friends" when the social-networking system determines the user is currently at a bar. As another example, the UI may prevent selection of content objects with a high maturity rating, but below the maturity threshold associated with DISNEYLAND.

In particular embodiments, the content objects displayed on the UI may be dynamically adjusted based on the current location of a mobile computing device. For example, content objects with a high maturity rating may be displayed on the UI while the mobile computing device is currently at a dance club, but replaced with content objects with a lower maturity rating when the mobile computing device is later determined to be located at a church.

Another filtering criterion for content objects to be displayed on the UI may be based on the user profile of the user. For example, certain content objects may be selected for display on the UI of the mobile computing device based on particular aspects of the user, such as age, religion, interests, etc. As an example, content objects with a high maturity rating shared by a "friend" may not be selected for display on the UI based on the user profile indicating the user may be socially conservative (e.g. based on age and religion).

Another filtering criterion for content objects may be based on social spam reporting. Users on the social-networking system may provide feedback that particular content objects may be objectionable. For example, a content object shared by a "friend" that has been flagged by other users as being objectionable, may be prevented from being displayed on the UI.

DESCRIPTION OF EXAMPLE EMBODIMENTS

Figure 1:
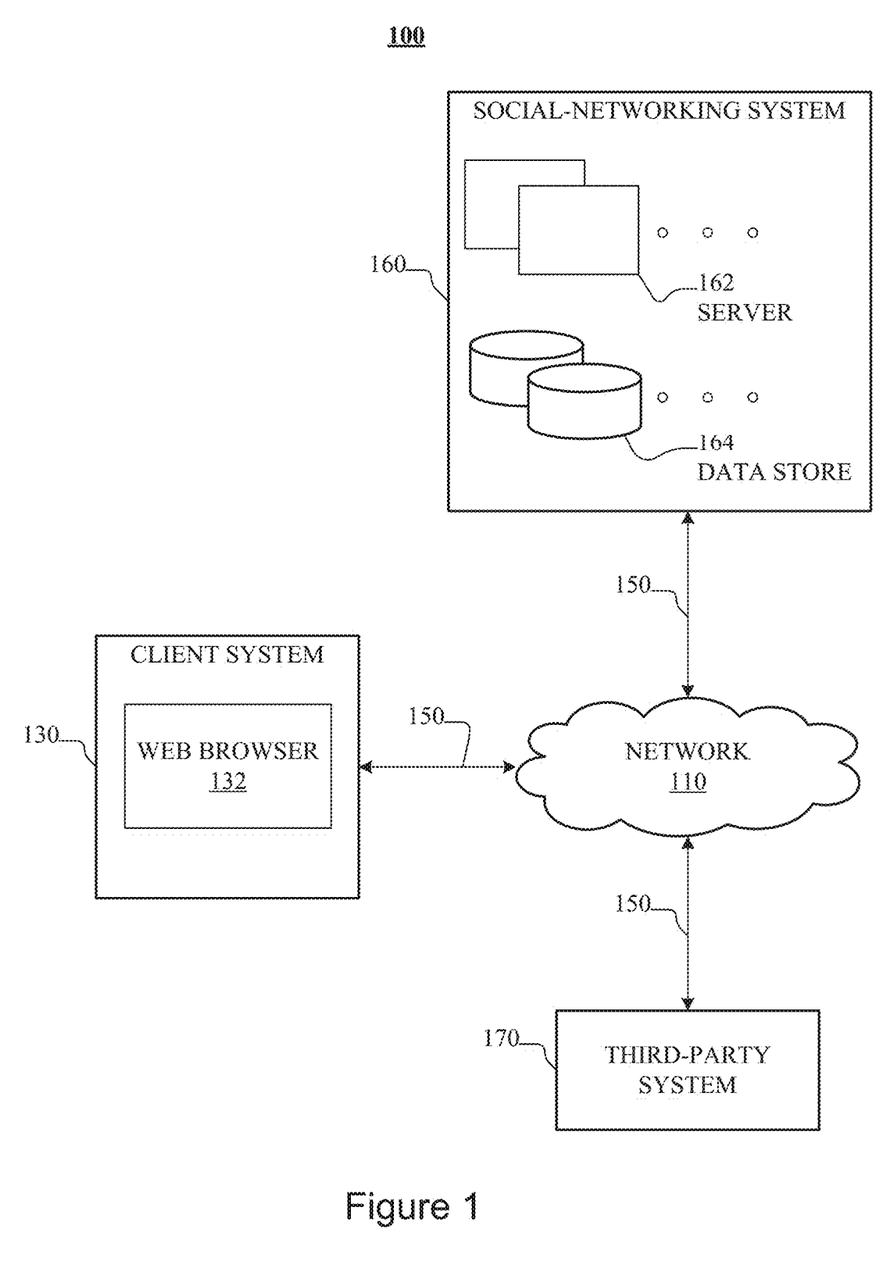
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). In particular embodiments, selection of content objects shared by "friends" for presentation on UI of client system 130 may be based at least in part on the connection information described above. A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposure to third-party-content objects. A notification controller may provide information regarding content objects to a client system 130. Information may be pushed to a client system 130 as notifications, or information may be pulled from client system 130 responsive to a request received from client system 130. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social-networking system 160 may generate, store, receive, and send social-networking data, such as, for example, user-profile data, concept-profile data, social-graph information, or other suitable data related to the online social network. In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream. As described below, content objects shared by "friends" of the user that are stored on social-networking 160 or third-party 170 system may displayed in a user interface (UI) of client system 130. In particular embodiments, filtering of particular content objects may be performed, such that presentation of particular content objects may be suppressed on a UI that may be publicly accessible. As an example and not by way of limitation, the content objects for presentation on client system 130 may be identified based at least in part on one or more "filtering" criteria, such as for example an amount of commonality between the user generating the content object and the user of client system 130 based at least in part on social-graph or user profile information, a maturity threshold level associated with a particular geo-location of client system 130, social-spam reporting, or any combination thereof. In particular embodiments, the "filtering" criteria may be considered a measure of suitability of each content object for presentation on a UI of client system 130 and one or more "filtering" criteria may be applied to the content objects shared by "friends" of the user. Although this disclosure describes identification of content objects by a particular computing system based on particular "filtering" criteria, this disclosure contemplates identification of content objects by any suitable computing system, such as for example a third-party system or client system, based on any suitable criteria.

As described below, connections of the user associated with client system 130 and "friends" on social-networking system 160 with other users of social-networking system 160 may be stored on a social graph. In particular embodiments, a particular "filtering" criterion may be the proximity between the user and the "friend" that generated each content object. Furthermore, social-networking system 160 may access the social graph of the user and determine a proximity between the user and the "friend" that generated each content object that is considered for presentation on one or more UIs of client system 130. Alternatively, social-networking system may ranked by degrees of separation between nodes of the social graph, where determination of degrees-of-separation between nodes of the social graph is described in more detail in U.S. patent application Ser. No. 13/310,564, entitled "System and Method for Managing Information Flow Between Members of an Online Social Network," filed on 2 Dec. 2011, which is incorporated by reference in its entirety and for all purposes.

As an example and not by way of limitation, social-networking system 160 may identify for presentation a content object generated by a "friend" connected to the user by an edge over a content object generated by a "friend" connected to the user though another "friend." As another example, social-networking system 160 may identify for presentation a content object generated by a "friend" connected to the user by a "friendship" edge over a content object generated by a "friend" connected to the user though a "work relationship" edge. As described below, social-graph information may include information related to activity (e.g. "liking" or "check-in") associated with a concept node, such as for example a business. As an example and not by way of limitation, social-networking system 160 may identify one or more content objects shared by a "friend" of the user that is a patron of the same establishments or entertainment venues as the user. As another example, social-networking system 160 may identify one or more content objects shared by a "friend" of the user that "likes" of the same sports teams, movies, books, or television shows as the user.

As described above, social-networking system 160 may store user-profile data associated with the user. In particular embodiments, social-networking 160 or third-party 170 system may access the user-profile data of the user and each "friend" sharing one or more content objects with the user. Furthermore, social-networking 160 or third-party 170 system may identify one or more content objects for presentation on one or more UIs of client system 130 based at least in part on a particular "filtering" criterion, such as for example an amount of overlap between user-profile data between the user and each "friend" sharing a content object. As an example and not by way of limitation, social-networking system 160 may identify for presentation a content object from one or more "friends" with user profiles that have a degree of commonality with the profile of the user, such as for example similar age, education, interests, or religion.

In particular embodiments, a "filtering" criterion may be based on a maturity rating associated with each content object. Furthermore, social-networking 160 or third-party 170 system may associate a maturity rating with one or more content objects. As an example and not by way of limitation, content objects (e.g. "check-ins") from particular geo-locations (e.g. bars or casinos) or particular third-party systems 170 or websites (e.g. associated with adult entertainment or online dating) may be considered "adult oriented" and may have a relatively high maturity rating. As another example, content objects from particular geo-locations or third-party systems 170 (e.g. DISNEYLAND or DISNEY.com) may be considered "family friendly" and may have a relatively low maturity rating. In particular embodiments, the identification of content objects shared by "friends" for presentation on client system 130 may be based at least in part on the maturity rating of each content object relative to a maturity threshold level. As an example and not by way of limitation, the maturity threshold level may be based at least in part on information associated with the current geo-location of client system 130. For example, the maturity threshold level may be relatively low when the current geo-location of client system 130 is at a church, while when the current geo-location of client system 130 is at a nightclub, the maturity threshold level may be relatively high. In particular embodiments, identification of content objects for presentation on the UI of client system 130 may determined at least in part on the maturity rating of the content objects in conjunction of user profile information of the user, such as for example age, religion, interests, or any combination thereof. As an example and not by way of limitation, "adult oriented" content objects with a relatively high maturity rating may be suppressed from being presented based at least in part on user profile information indicating the user may be socially conservative (e.g. based on age or religion).

In particular embodiments, feedback of users regarding one or more content objects, such for example one or more users of social-networking system 160 may flag particular content objects stored on social-networking system 160 as being objectionable or inappropriate for public viewing, may be the basis of a "filtering" criterion. Furthermore, while the particular content object may not be removed from social-networking system 160, presentation of the flagged content object on a UI of client system 130 may be suppressed based at least in part on feedback of other users of social-networking system 160. As an example and not by way of limitation, a user may flag content objects with crude language as being offensive. Furthermore, a UI of social-networking system 160 may include an interactive element for users of social-networking system 160 to flag particular content objects as "spam."

In particular embodiments, social-networking 160 or third-party 170 system may poll or "ping" client system 130 using an activation signal to obtain location information from client system 130. In particular embodiments, the location information may be stored in the location stores of social-networking system 160 as described above. As an example and not by way of limitation, social-networking system 160 may poll an application or program executed on client system 130 for location data by sending the activation signal to activate the location service of client system 130. The activation signal may be transmitted using network 110. In particular embodiments, the location service of client system 130 may use one or more methods of location determination, such as for example, using the location of one or more cellular towers, crowd-sourced location information associated with a WI-FI hotspot, or a global positioning system (GPS) function of client system 130. As described above, social-networking system 160 may, automatically and without manual input, determine a geo-location associated with client system 130 based in part on the location data provided by client system 130. Alternatively, social-networking 160 or third-party 170 system may receive location data of client system 130 through the user initiating a location update, through a "check-in" performed by the user, or any combination thereof.

As described above, the maturity threshold level at a particular moment may be based at least in part on the current geo-location of client system 130. As an example and not by way of limitation, social-networking 160 or third-party 170 system may determine the geo-location of client system 130 and access directory information associated with the particular geo-location, such as for example the type of business or hours of operation, to determine the maturity threshold level of the geo-location. For example, the location data sent from client system 130 may be correlated with directory information associated to determine client system 130 is currently located at a church. Furthermore, social-networking 160 or third-party 170 system may assign a relatively low maturity threshold level to the particular geo-location based at least in part on the directory information. In particular embodiments, social-networking system 160 may identify content objects shared by "friends" for presentation on the UI of client system 130 that have a maturity rating that is lower than the maturity threshold level associated with the current geo-location of client system 130. As an example and not by way of limitation, "adult oriented" content objects with a relatively high maturity rating may not be identified for presentation on UI of client system 130 when client system 130 is at a geo-location with a relatively low maturity threshold level such as for example a petting zoo. As another example, "adult oriented" content objects with a relatively high maturity rating (e.g. a notification a "friend" "likes" a brand of alcoholic beverages) may be identified for presentation on UI of client system 130 when client system 130 is at a geo-location with a relatively high maturity threshold level such as for example a liquor store. As described below, social-networking system 160 may dynamically adjust identification of content objects for presentation on the UI of client system 130 based on movement of client system 130 between geo-locations with differing maturity threshold levels.

In particular embodiments, social-networking system 160 may include an authorization server that allows users to opt in or opt out of having their actions logged by social-networking system 160 or shared with other systems (e.g. third-party systems 170), such as, for example, by setting appropriate privacy settings. The authorization server of social-networking system 160 may be used to enforce one or more privacy settings of the users of social-networking system 160. A privacy setting of a user determines how particular information or content objects associated with the user can be shared. In particular embodiments, the content objects shared by other users and provided by social-networking system 160 for presentation on the UI of client system 130 may be restricted by the privacy settings of users of social-networking system 160.

Figure 2:
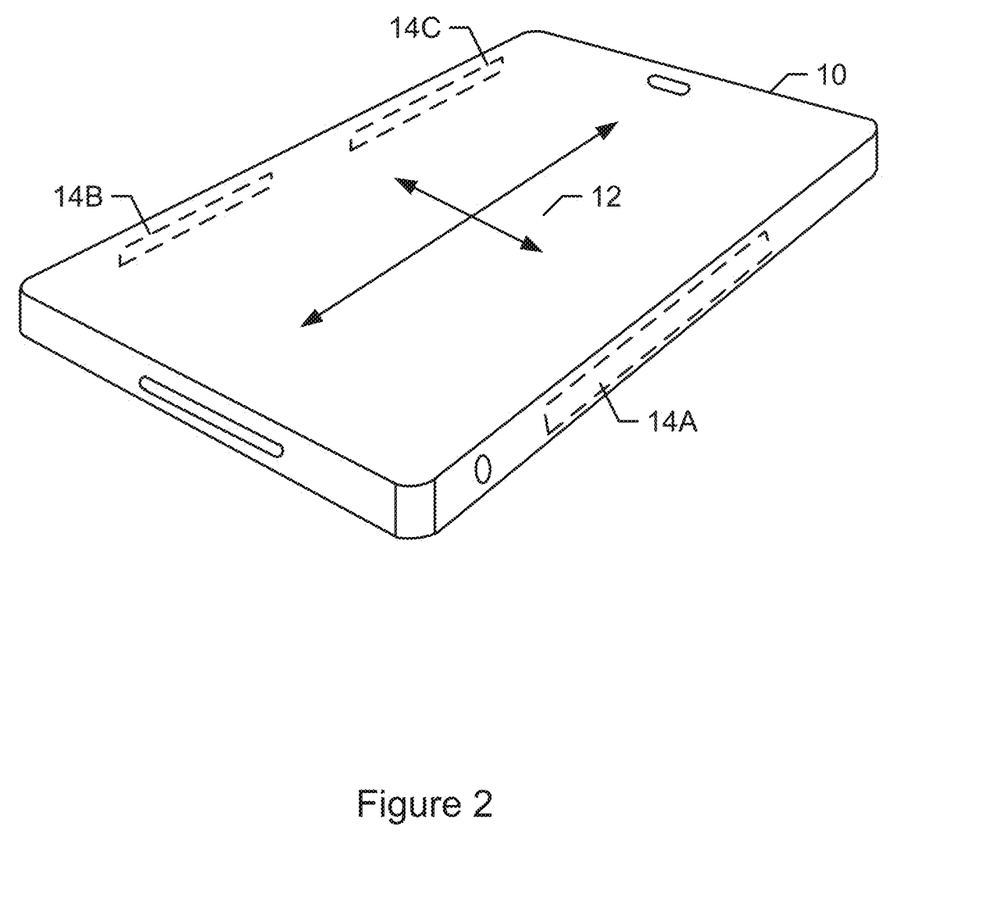
FIG. 2 illustrates an example mobile device.

FIG. 2 illustrates an example mobile computing device. In particular embodiments, the client system may be a mobile computing device 10 as described above. This disclosure contemplates mobile computing device 10 taking any suitable physical form. In particular embodiments, mobile computing device 10 may be a computing system as described below. As example and not by way of limitation, mobile computing device 10 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile computing device 10 may have a touch sensor 12 as an input component. In the example of FIG. 2, touch sensor 12 is incorporated on a front surface of mobile device 10. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 2, one or more antennae 14A-B may be incorporated into one or more sides of mobile computing device 10. Antennae 14A-B are components that convert electric current into radio waves, and vice versa. During transmission of signals, a transmitter applies an oscillating radio frequency (RF) electric current to terminals of antenna 14A-B, and antenna 14A-B radiates the energy of the applied the current as electromagnetic (EM) waves. During reception of signals, antennae 14A-B convert the power of an incoming EM wave into a voltage at the terminals of antennae 14A-B. The voltage may be transmitted to a receiver for amplification.

Mobile computing device 10 many include a communication component coupled to antennae 14A-B for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component for it. As an example and not by way of limitation, mobile computing device 10 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile computing device 10 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile computing device 10 may include any suitable communication component for any of these networks, where appropriate. Although this disclosure illustrates and describes a particular type of computing device, this disclosure contemplates a lock screen implemented on any suitable type of computing device, such as for example, a personal computer, tablet computer, connected television, or a smartphone.

As described above, mobile computing device 10 may communicate with a social-networking system through a network as described above. In particular embodiments, mobile computing device 10 may receive data corresponding to one or more content objects from the social-networking system through the network. In particular embodiments, upon powering up, mobile computing device 10 may communicate with the social-networking or third-party system and dynamically request one or more content objects stored on the social-networking system for presentation on a particular UI of mobile computing system 10. As described above, one or more of the content objects may be shared on the social-networking system by "friends" of the user. As described below, the content objects corresponding to the data received from the social-networking system may be presented on one or more UIs of mobile computing device 10. In particular embodiments, mobile computing device 10 may perform application of one or more "filtering" criteria on content objects received from the social-networking system and identify one or more content objects for display on one or more UIs of mobile computing device 10 based at least in part on the application of the "filtering" criteria.

In particular embodiments, a UI of mobile computing device 10 may display content objects shared by "friends" of the user that may be identified based at least in part on social-graph information, as described above. In particular embodiments, the UI with socially filtered content objects may be a UI, such as for example, a lock screen of mobile computing device 10. A lock screen prevents any or a particular interaction with mobile computing device 10 while in a locked mode. The lock screen may be displayed when mobile computing device 10 is in the locked mode and mobile computing device 10 may be released from the locked mode or directed to a personal identification number (PIN) lock by performing a pre-determined touch gesture. In particular embodiments, the user may be able to access all or a subset of all the features of mobile computing device 10 available to the user during normal operation of mobile computing device 10 by performing a pre-determined touch gesture. Although this disclosure illustrates and describes a particular UI with particular UI elements, this disclosure contemplates any suitable UI, persistent or non-persistent, with any suitable UI elements.

Figure 3A:
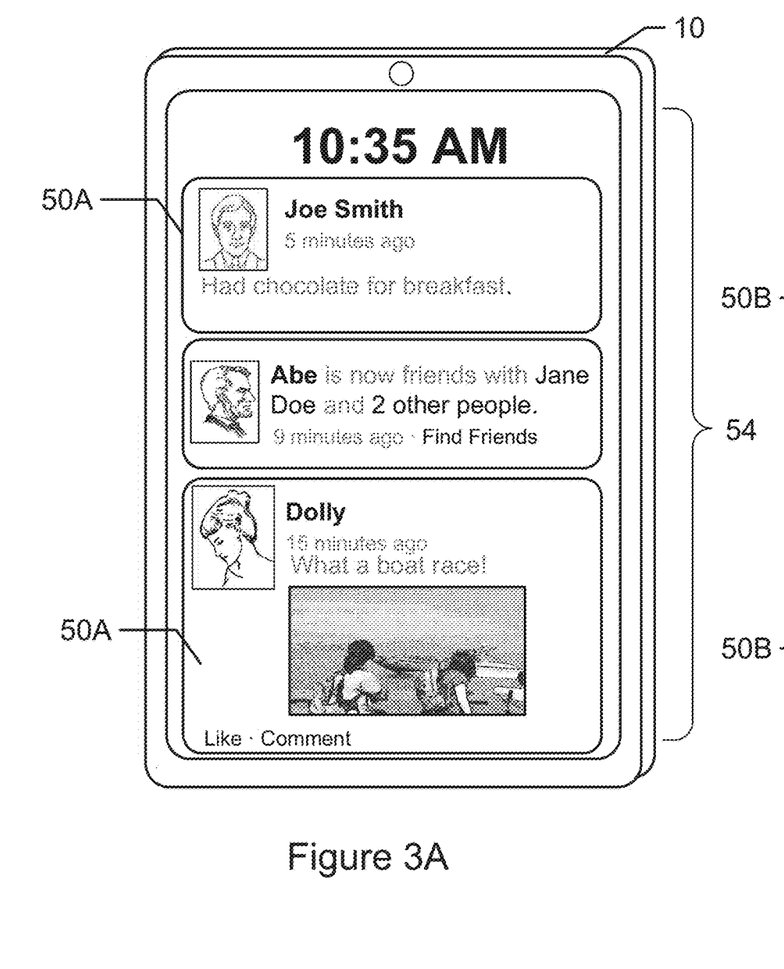
FIGS. 3A-B illustrate example wireframes for an example user interface (UI) with filtered content.
Figure 3B:
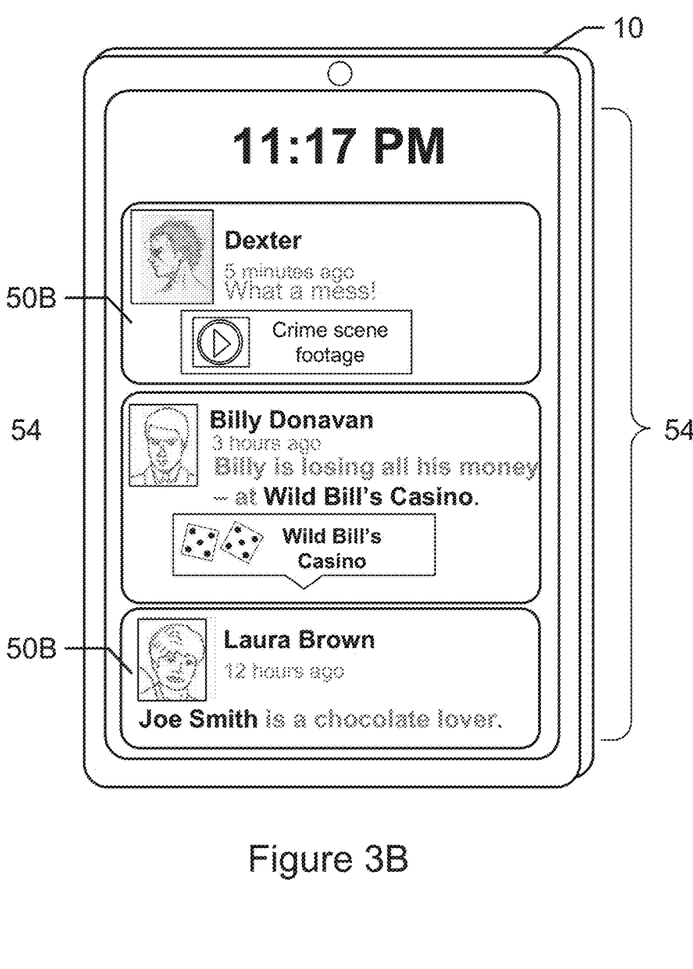

FIGS. 3A-B illustrate example wireframes for an example UI with socially filtered content objects. Although this disclosure illustrates and describes presentation of socially filtered content object on a particular UI of particular computing devices, this disclosure contemplates presentation of socially filtered content objects on any suitable UI of any suitable computing device, such as for example a laptop or desktop computer. As described above, UI 54 with socially filtered content objects 50A-B may be a lock screen provided for display when mobile computing device 10 is in the locked mode. As described above, identification of content objects 50A-B for presentation on UI 54 may be based at least in part on one or more "filtering" criteria. As an example and not by way of limitation, content object 50A shared by user "Joe Smith" may be identified for presentation on UI 54 based a proximity to between user "Joe Smith" and the user associated with mobile computing device 10 as described above. As illustrated in the example of FIG. 3A, content object 50A shared by user "Dolly" may be identified for presentation on UI 54 based at least in part on user profile information indicating user "Dolly" and the user associated with mobile computing device 10 sharing a common interest, such as for example boat racing.

In particular embodiments, identification of content objects 50A-B for presentation on UI 54 of mobile computing device 10 may be dynamically adjusted based at least in part on movement of mobile computing device 10 between geo-locations with differing maturity threshold levels described above. Although this disclosure describes dynamically adjusting identification of socially filtered notifications for presentation based at least in part on a particular "filtering" criterion, this disclosure contemplates dynamically adjusting identification of socially filtered content objects based on any suitable criteria, such as for example the time of day. As illustrated in the example of FIG. 3A, one or more content objects 50A having a relatively low maturity rating may be presented on UI 54 in response to mobile computing device 10 being at a geo-location with a relatively low maturity threshold level, such as for example, a children's fun house. As an example and not by way of limitation, each content objects 50A presented in UI 54 may have a maturity rating lower than the maturity threshold level associated with the current geo-location. Furthermore, presentation of content objects 50B with a maturity rating above the maturity threshold level may be suppressed. As illustrated in the example of FIG. 3B, one or more content objects 50B with a relatively high maturity rating may be presented on UI 54 in response to mobile computing device 10 moving from a geo-location with a relatively low maturity threshold level to a geo-location with a relatively high maturity threshold level, such as for example a sports bar. As an example and not by way of limitation, content objects 50B may be assigned a relatively high maturity rating based on content object 50B having characteristics, such as for example graphic violence, off-color humor, being flagged as "spam" by other users, or being associated with an "adult oriented" entity. Conversely, dynamic adjustment of presentation of content objects 50A-B may be performed in response to mobile computing device 10 moving from a geo-location with a relatively high maturity threshold level to a geo-location with a low maturity threshold level.

Alternatively or in addition, identification of content objects for presentation and determination of the maturity threshold level may be based at least in part on the time of day. As an example and not by way of limitation, "adult oriented" content objects 50B may be identified for presentation on UI 54 during hours with a relatively high maturity threshold level, such as for example after 10 PM. Furthermore, presentation of content objects 50A-B may be adjusted over time, such that content objects 50A with a relatively low maturity rating may be presented on UI 54 during daytime hours, while content objects 50B with a relatively high maturity rating may be presented during late evening hours.

Figure 4:
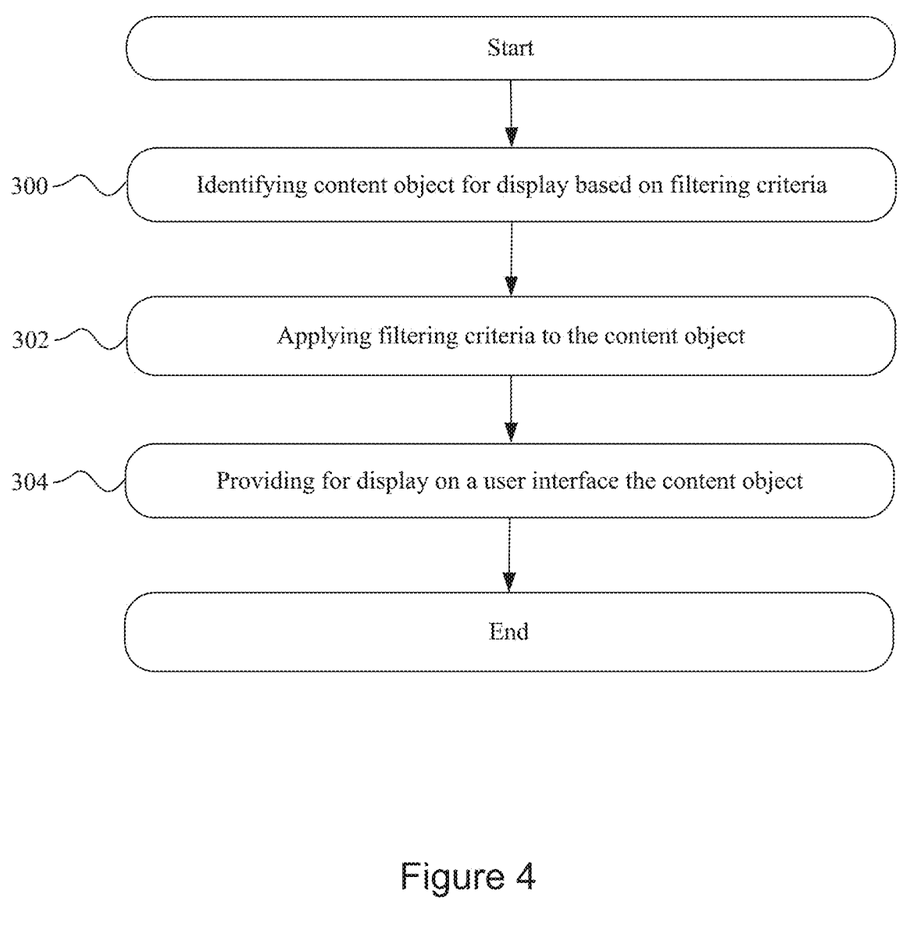
FIG. 4 illustrates an example method for social filtering of content objects on a UI.

FIG. 4 illustrates an example method for socializing applications on a UI. The method may start at step 300, where a computing device identifies a content object for display based at least in part on one or more criteria. In particular embodiments, the criteria may be a measure of suitability of each content object for presentation based at least in part on social-graph information between the first user and one or more second users or a current geo-location of the first user. In particular embodiments, the computing device is a server computing device of a social-networking system. In particular embodiments, the computing device is a mobile computing device of the first user and the UI is a lock screen of the mobile computing device. Step 302, by the computing device, applies the criteria to the content object. At step 304, the computing device provides for display on a user interface (UI) the content object based on whether the content object is suitable for presentation based at least in part on the criteria, at which point the method may end. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components carrying out particular steps of the method of FIG. 4, this disclosure contemplates any suitable combination of any suitable components carrying out any suitable steps of the method of FIG. 4.

Figure 5:
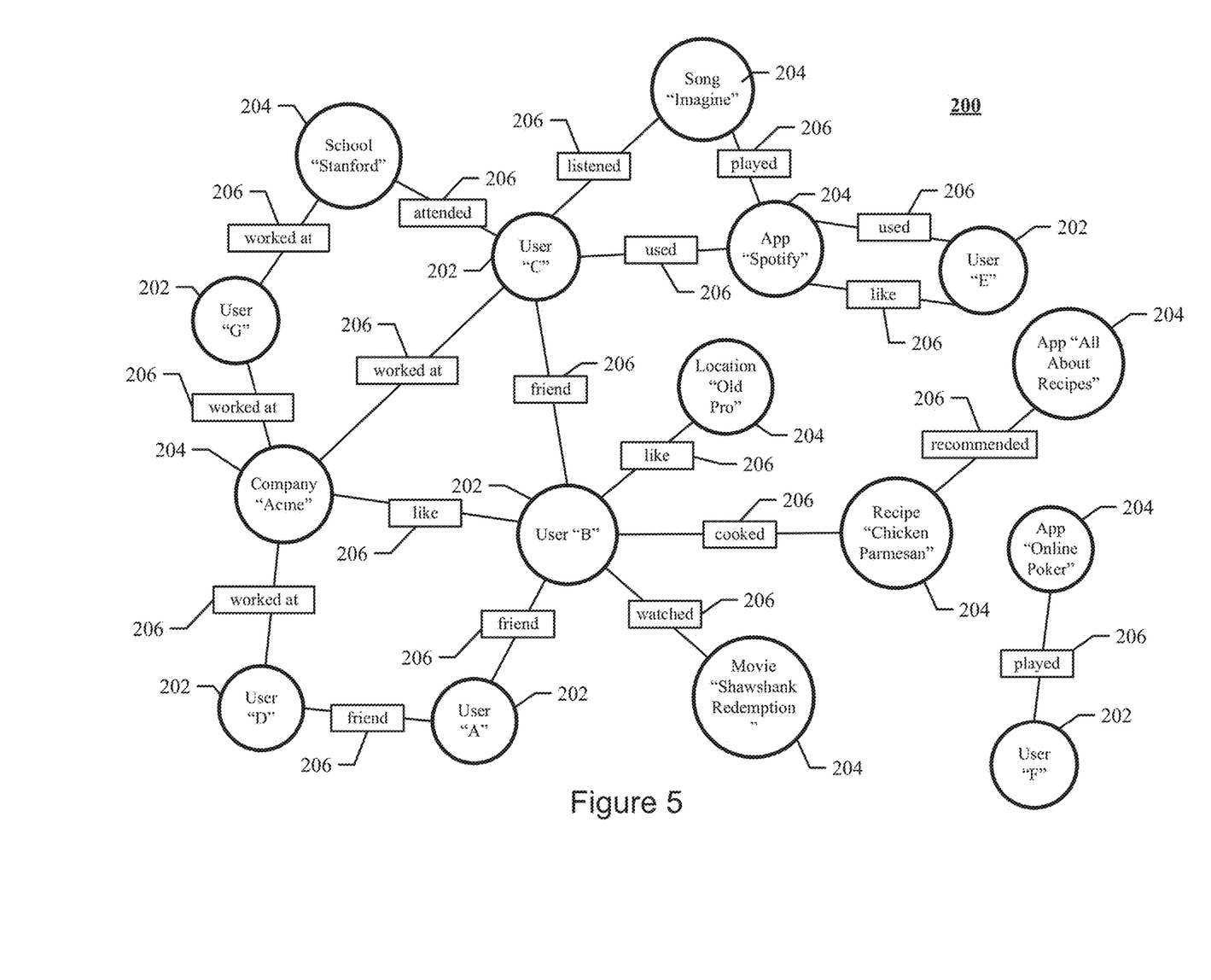
FIG. 5 illustrates an example social graph.

FIG. 5 illustrates an example social graph. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 5 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to transmit to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 5, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 5, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "like" icon. As another example, the socialized dash of a client system may include a selectable "check in" icon (such as, for example, a clickable "check in" icon) or a selectable "like" icon. Similarly, after a user clicks these icons, social-networking system 160 may create a "like" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 5) between user nodes 202 corresponding to the user and concept nodes 204 corresponding to the song and application to indicate that the user listened to the song and used the application. Moreover, social-networking system 160 may create a "played" edge 206 (as illustrated in FIG. 5) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 5 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Figure 6:
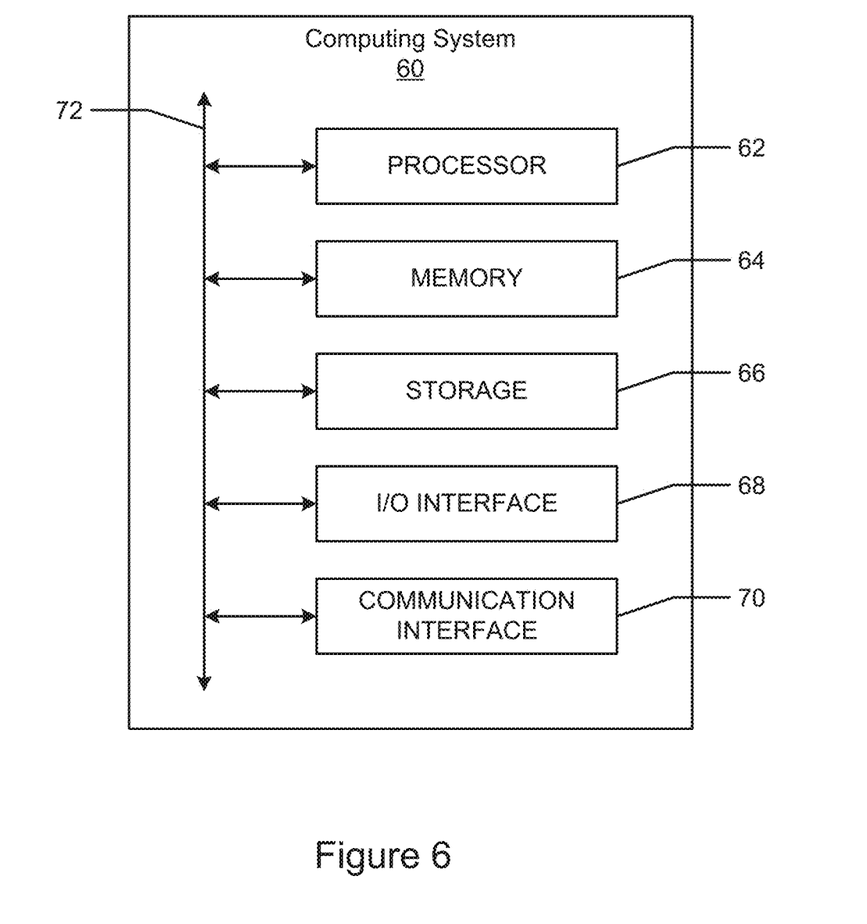
FIG. 6 illustrates an example computing system.

FIG. 6 illustrates example computing system. In particular embodiments, one or more computer systems 60 perform one or more steps of one or more methods described or illustrated herein. In particular embodiments, one or more computer systems 60 provide functionality described or illustrated herein. In particular embodiments, software running on one or more computer systems 60 performs one or more steps of one or more methods described or illustrated herein or provides functionality described or illustrated herein. Particular embodiments include one or more portions of one or more computer systems 60. Herein, reference to a computer system may encompass a computing device, where appropriate. Moreover, reference to a computer system may encompass one or more computer systems, where appropriate.

This disclosure contemplates any suitable number of computer systems 60. This disclosure contemplates computer system 60 taking any suitable physical form. As example and not by way of limitation, computer system 60 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 60 may include one or more computer systems 60; be unitary or distributed; span multiple locations; span multiple machines; span multiple data centers; or reside in a cloud, which may include one or more cloud components in one or more networks. Where appropriate, one or more computer systems 60 may perform without substantial spatial or temporal limitation one or more steps of one or more methods described or illustrated herein. As an example and not by way of limitation, one or more computer systems 60 may perform in real time or in batch mode one or more steps of one or more methods described or illustrated herein. One or more computer systems 60 may perform at different times or at different locations one or more steps of one or more methods described or illustrated herein, where appropriate.

In particular embodiments, computer system 60 includes a processor 62, memory 64, storage 66, an input/output (I/O) interface 68, a communication interface 70, and a bus 72. Although this disclosure describes and illustrates a particular computer system having a particular number of particular components in a particular arrangement, this disclosure contemplates any suitable computer system having any suitable number of any suitable components in any suitable arrangement.

In particular embodiments, processor 62 includes hardware for executing instructions, such as those making up a computer program. As an example and not by way of limitation, to execute instructions, processor 62 may retrieve (or fetch) the instructions from an internal register, an internal cache, memory 64, or storage 66; decode and execute them; and then write one or more results to an internal register, an internal cache, memory 64, or storage 66. In particular embodiments, processor 62 may include one or more internal caches for data, instructions, or addresses. This disclosure contemplates processor 62 including any suitable number of any suitable internal caches, where appropriate. As an example and not by way of limitation, processor 62 may include one or more instruction caches, one or more data caches, and one or more translation lookaside buffers (TLBs). Instructions in the instruction caches may be copies of instructions in memory 64 or storage 66, and the instruction caches may speed up retrieval of those instructions by processor 62. Data in the data caches may be copies of data in memory 64 or storage 66 for instructions executing at processor 62 to operate on; the results of previous instructions executed at processor 62 for access by subsequent instructions executing at processor 62 or for writing to memory 64 or storage 66; or other suitable data. The data caches may speed up read or write operations by processor 62. The TLBs may speed up virtual-address translation for processor 62. In particular embodiments, processor 62 may include one or more internal registers for data, instructions, or addresses. This disclosure contemplates processor 62 including any suitable number of any suitable internal registers, where appropriate. Where appropriate, processor 62 may include one or more arithmetic logic units (ALUs); be a multi-core processor; or include one or more processors 62. Although this disclosure describes and illustrates a particular processor, this disclosure contemplates any suitable processor.

In particular embodiments, memory 64 includes main memory for storing instructions for processor 62 to execute or data for processor 62 to operate on. As an example and not by way of limitation, computer system 60 may load instructions from storage 66 or another source (such as, for example, another computer system 60) to memory 64. Processor 62 may then load the instructions from memory 64 to an internal register or internal cache. To execute the instructions, processor 62 may retrieve the instructions from the internal register or internal cache and decode them. During or after execution of the instructions, processor 62 may write one or more results (which may be intermediate or final results) to the internal register or internal cache. Processor 62 may then write one or more of those results to memory 64. In particular embodiments, processor 62 executes only instructions in one or more internal registers or internal caches or in memory 64 (as opposed to storage 66 or elsewhere) and operates only on data in one or more internal registers or internal caches or in memory 64 (as opposed to storage 66 or elsewhere). One or more memory buses (which may each include an address bus and a data bus) may couple processor 62 to memory 64. Bus 72 may include one or more memory buses, as described below. In particular embodiments, one or more memory management units (MMUs) reside between processor 62 and memory 64 and facilitate accesses to memory 64 requested by processor 62. In particular embodiments, memory 64 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 64 may include one or more memories 64, where appropriate. Although this disclosure describes and illustrates particular memory, this disclosure contemplates any suitable memory.

In particular embodiments, storage 66 includes mass storage for data or instructions. As an example and not by way of limitation, storage 66 may include a hard disk drive (HDD), a floppy disk drive, flash memory, an optical disc, a magneto-optical disc, magnetic tape, or a Universal Serial Bus (USB) drive or a combination of two or more of these. Storage 66 may include removable or non-removable (or fixed) media, where appropriate. Storage 66 may be internal or external to computer system 60, where appropriate. In particular embodiments, storage 66 is non-volatile, solid-state memory. In particular embodiments, storage 66 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 66 taking any suitable physical form. Storage 66 may include one or more storage control units facilitating communication between processor 62 and storage 66, where appropriate.

Where appropriate, storage 66 may include one or more storages 66. Although this disclosure describes and illustrates particular storage, this disclosure contemplates any suitable storage.

In particular embodiments, I/O interface 68 includes hardware, software, or both providing one or more interfaces for communication between computer system 60 and one or more I/O devices. Computer system 60 may include one or more of these I/O devices, where appropriate. One or more of these I/O devices may enable communication between a person and computer system 60. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 68 for them. Where appropriate, I/O interface 68 may include one or more device or software drivers enabling processor 62 to drive one or more of these I/O devices. I/O interface 68 may include one or more I/O interfaces 68, where appropriate. Although this disclosure describes and illustrates a particular I/O interface, this disclosure contemplates any suitable I/O interface.

In particular embodiments, communication interface 70 includes hardware, software, or both providing one or more interfaces for communication (such as for example, packet-based communication) between computer system 60 and one or more other computer systems 60 or one or more networks. As an example and not by way of limitation, communication interface 70 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 70 for it. As an example and not by way of limitation, computer system 60 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 60 may communicate with a wireless PAN (WPAN) (such as for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 60 may include any suitable communication interface 70 for any of these networks, where appropriate. Communication interface 70 may include one or more communication interfaces 70, where appropriate. Although this disclosure describes and illustrates a particular communication interface, this disclosure contemplates any suitable communication interface.

In particular embodiments, bus 72 includes hardware, software, or both coupling components of computer system 60 to each other. As an example and not by way of limitation, bus 72 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 72 may include one or more buses 72, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a computing device, identifying a first set of content objects for display based at least in part on one or more criteria, the one or more criteria being based at least in part on social-graph information between a first user and one or more second users of an online social network;
by the computing device, selecting content objects from the first set of content objects based on the one or more criteria;
by the computing device, providing the selected content objects for display in a user interface; and by the computing device, dynamically adjusting the displayed content objects in the user interface based at least in part on a change of time, wherein the dynamically adjusting comprises:
  determining a content-rating threshold level for determining suitable content based at least in part on social-graph commonalities between the first user and one or more second users of the online social network, wherein the social-graph commonalities satisfy a threshold level for determining the suitable content, wherein the suitable content consists of content determined to be appropriate for display based at least in part on a type of the content-rating threshold level;
  identifying a second set of content objects based at least on the determined content-rating threshold level for determining suitable content; and
  adding one or more content objects from the second set of content objects to the displayed content objects in the user interface.

2. The method of claim 1, wherein:
the social-graph information is based at least in part on a social graph associated with the online social network, the social graph comprising a plurality of nodes and edges connecting the nodes, wherein at least one node in the social graph corresponds to the first user, and wherein at least one node in the social graph corresponds to each second user; and
the social-graph commonalities are based at least in part on an amount of overlap between a user profile or social-graph information associated with the first user and a user profile or social-graph information associated with a second user connected to the first user by at least one edge.

3. The method of claim 1, wherein the dynamically adjusting further comprises:
  determining that content objects from the displayed content objects do not satisfy the content-rating threshold level; and
  removing a number of content objects from the displayed content objects that do not satisfy the content-rating threshold level.

4. The method of claim 3, wherein the adding one or more content objects to the displayed content objects further comprises adding a number of content objects from the second set of content objects based on the number of removed content objects.

5. The method of claim 1, wherein the determined content-rating threshold level is further based at least in part on a content-maturity rating range, wherein a content object is assigned a content-maturity rating within the range.

6. The method of claim 5, wherein the dynamically adjusting further comprises:
  determining a content-maturity rating of at least one content object in the second set of content objects;
  determining that the content-maturity rating of the at least one content object in the second set of content objects does not satisfy the determined content-rating threshold level; and
  removing the at least one content object with the content-maturity rating that does not satisfy the determined content-rating threshold level from the second set of content objects.

7. The method of claim 1, wherein the dynamically adjusting further comprises:
  determining that content objects from the displayed content objects have been flagged by one or more users of second users of the online social network above a commonality level; and
  removing at least one flagged content object of the flagged content objects from the displayed content objects.

8. The method of claim 1, wherein:
the computing device is a mobile computing device of the first user; and
the user interface is a lock screen of the mobile computing device.

9. One or more computer-readable non-transitory storage media embodying software configured when executed to:
  identify a first set of content objects for display based at least in part on one or more criteria, the one or more criteria being based at least in part on social-graph information between a first user and one or more second users of an online social network;
  select content objects from the first set of content objects based on the one or more criteria;
  provide the selected content objects for display in a user interface; and
  execute a dynamic adjustment of the displayed content objects in the user interface based at least in part on a change of time, wherein the dynamic adjustment comprises:
    a determination of a content-rating threshold level for determining suitable content based at least in part on social-graph commonalities between the first user and one or more second users of the online social network, wherein the social-graph commonalities satisfy a threshold level for determining the suitable content, wherein the suitable content consists of content determined to be appropriate for display based at least in part on a type of the content-rating threshold level;
    an identification of a second set of content objects based at least on the determined content-rating threshold level for determining suitable content; and
    an addition of one or more content objects from the second set of content objects to the displayed content objects in the user interface.

10. The one or more computer-readable non-transitory storage media of claim 9, wherein:
the social-graph information is based at least in part on a social graph associated with the online social network, the social graph comprising a plurality of nodes and edges connecting the nodes, wherein at least one node in the social graph corresponds to the first user, and wherein at least one node in the social graph corresponds to each second user; and
the social-graph commonalities are based at least in part on an amount of overlap between a user profile or social-graph information associated with the first user and a user profile or social-graph information associated with a second user connected to the first user by at least one edge.

11. The one or more computer-readable non-transitory storage media of claim 9, wherein the dynamic adjustment further comprises:
  a determination that content objects from the displayed content objects do not satisfy the content-rating threshold level; and
  a removal of a number of content objects from the displayed content objects that do not satisfy the content-rating threshold level.

12. The one or more computer-readable non-transitory storage media of claim 11, wherein the addition of one or more content objects to the displayed content objects further comprises an addition of a number of content objects from the second set of content objects based on the number of removed content objects.

13. The one or more computer-readable non-transitory storage media of claim 9, wherein the determined content-rating threshold level is further based at least in part on a content-maturity rating range, wherein a content object is assigned a content-maturity rating within the range.

14. The one or more computer-readable non-transitory storage media of claim 13, wherein the dynamic adjustment further comprises:
   a determination of a content-maturity rating of at least one content object in the second set of content objects;
   a determination that the content-maturity rating of the at least one content object in the second set of content objects does not satisfy the determined content-rating threshold level; and
   a removal of the at least one content object with the content-maturity rating that does not satisfy the determined content-rating threshold level from the second set of content objects.

15. The one or more computer-readable non-transitory storage media of claim 9, wherein the dynamic adjustment further comprises:
   determining a determination that content objects from the displayed content objects have been flagged by one or more users of second users of the online social network above a commonality level; and
   a removal of at least one flagged content object of the flagged content objects from the displayed content objects.

16. The one or more computer-readable non-transitory storage media of claim 9, wherein:
   the media is coupled to a processor of a mobile computing device of the first user; and
   the user interface is a lock screen of the mobile computing device.

17. A device comprising:
   a processor; and
   one or more computer-readable non-transitory storage media coupled to the processor and embodying software comprising steps to:
      identify a first set of content objects for display based at least in part on one or more criteria, the one or more criteria being based at least in part on social-graph information between a first user and one or more second users of an online social network;
      select content objects from the first set of content objects based on the one or more criteria;
      provide the selected content objects for display in a user interface; and
      execute a dynamic adjustment of the displayed content objects in the user interface based at least in part on a change of time, wherein the dynamic adjustment comprises:
         a determination of a content-rating threshold level for determining suitable content based at least in part on social-graph commonalities between the first user and one or more second users of the online social network, wherein the social-graph commonalities satisfy a threshold level for determining the suitable content, wherein the suitable content consists of content determined to be appropriate for display based at least in part on a type of the content-rating threshold level;
         an identification of a second set of content objects based at least on the determined content-rating threshold level for determining suitable content; and
         an addition of one or more content objects from the second set of content objects to the displayed content objects in the user interface.

18. The device of claim 17, wherein:
   the social-graph information is based at least in part on a social graph associated with the online social network, the social graph comprising a plurality of nodes and edges connecting the nodes, wherein at least one node in the social graph corresponds to the first user, and wherein at least one node in the social graph corresponds to each second user; and
   the social-graph commonalities are based at least in part on an amount of overlap between a user profile or social-graph information associated with the first user and a user profile or social-graph information associated with a second user connected to the first user by at least one edge.

19. The device of claim 17, wherein the dynamic adjustment further comprises:
   a determination that content objects from the displayed content objects do not satisfy the content-rating threshold level; and
   a removal of a number of content objects from the displayed content objects that do not satisfy the content-rating threshold level.

20. The device of claim 19, wherein the addition of one or more content objects to the displayed content objects further comprises an addition of a number of content objects from the second set of content objects based on the number of removed content objects.

* * * * *